United States Patent
Bogacki et al.

(10) Patent No.: US 11,562,575 B2
(45) Date of Patent: Jan. 24, 2023

(54) METHODS AND SYSTEMS FOR OBJECT DETECTION

(71) Applicant: Aptiv Technologies Limited, St. Michael (BB)

(72) Inventors: Piotr Bogacki, Cracow (PL); Rafal Dlugosz, Lubon (PL)

(73) Assignee: Aptiv Technologies Limited, St. Michael (BB)

( * ) Notice: Subject to any disclaimer, the term of this patent is extended or adjusted under 35 U.S.C. 154(b) by 164 days.

(21) Appl. No.: 17/178,098

(22) Filed: Feb. 17, 2021

(65) Prior Publication Data

US 2021/0271907 A1 Sep. 2, 2021

(30) Foreign Application Priority Data

Feb. 28, 2020 (EP) ..................................... 20160077

(51) Int. Cl.
| | |
|---|---|
| *G06K 9/00* | (2022.01) |
| *G06K 9/62* | (2022.01) |
| *G06N 3/02* | (2006.01) |
| *G06V 20/58* | (2022.01) |
| *G06V 10/60* | (2022.01) |

(52) U.S. Cl.
CPC ............ *G06V 20/584* (2022.01); *G06N 3/02* (2013.01); *G06V 10/60* (2022.01)

(58) Field of Classification Search
CPC ......... G06V 20/584; G06V 10/60; G06N 3/02
See application file for complete search history.

(56) References Cited

U.S. PATENT DOCUMENTS

| | | | |
|---|---|---|---|
| 2016/0203384 A1* | 7/2016 | Richmond | G06V 10/955 382/170 |
| 2017/0193313 A1* | 7/2017 | Kudana | G06V 20/582 |
| 2020/0001777 A1* | 1/2020 | Hiroi | B60Q 1/1423 |

FOREIGN PATENT DOCUMENTS

WO 2017093037 6/2017

OTHER PUBLICATIONS

Xiao et al, 'Traffic Sign Detection Based on Histograms of Oriented Gradients and Boolean Convolutional Neural Networks', 2017, International Conference on Machine Vision and Information Technology, pp. 111-115 (5 pages) (Year: 2017).*
"Bresenham's line algorithm—Wikipedia", Downloaded at: https://en.wikipedia.org/wiki/Bresenham%27s_line_algorithm—on Feb. 2, 2021, 10 pages.
"Extended European Search Report", EP Application No. 20160077.2, dated Jul. 24, 2020, 7 pages.

(Continued)

*Primary Examiner* — David F Dunphy
(74) *Attorney, Agent, or Firm* — Sawtooth Patent Group PLLC (57) ABSTRACT

A computer implemented method for object detection includes the following steps carried out by computer hardware components: acquiring an image; determining a pixel of the image as a base pixel; determining coordinates of a plurality of sets of target pixels, each set of target pixels including a plurality of pixels in a respective pre-determined relationship to the base pixel; for each of the sets of target pixels, determining information representing values of the pixels in the respective set of target pixels; and determining whether a pre-determined object is shown in the image based on the determined information.

20 Claims, 9 Drawing Sheets

(56) References Cited

OTHER PUBLICATIONS

Alcantarilla, et al., "Automatic LightBeam Controller for Driver Assistance", Mar. 27, 2011, 17 pages.
Bay, "SURF: Speeded Up Robust Features", Jul. 2006, 15 pages.
Chen, "Nighttime vehicle light detection on a moving vehicle using image segmentation and analysis techniques", Mar. 2008, pp. 506-515.
Dalal, et al., "Object Detection Using Histograms of Oriented Gradients", May 7, 2006, 20 pages.
Lopez, et al., "Nighttime vehicle detection for intelligent headlight control", Oct. 2008.
Lowe, "Object Recognition from Local Scale-Invariant Features", Sep. 1999, 8 pages.
Lu, "Finger Vein Identification Using Polydirectional Local Line Binary Pattern", Oct. 2013, pp. 61-65.
Ojala, et al., "Multiresolution Gray-Scale and Rotation Invariant Texture Classification with Local Binary Patterns", Jul. 2002, pp. 971-987.
Yin, "Fast Traffic Sign Recognition with a Rotation Invariant Binary Pattern Based Feature", Jan. 2015, pp. 2161-2180.

\* cited by examiner

METHODS AND SYSTEMS FOR OBJECT DETECTION

CROSS-REFERENCE TO RELATED APPLICATION

This application claims priority to European Patent Application Number 20160077.2, filed Feb. 28, 2020, the disclosure of which is hereby incorporated by reference in its entirety herein.

BACKGROUND

The present disclosure relates to methods and systems for object detection, in particular for headlight recognition or for traffic sign recognition.

Digital imaging devices, such as digital cameras, are used in various automotive applications. One such application is adaptive headlight control to switch between low beam and high beam. Headlight control is relevant to the safety of the vehicles because high beam light may dazzle a driver from an oncoming or a preceding vehicle by an excessive glare. Adaptive headlight control may be carried out based on headlight detection.

Accordingly, there is a need to provide devices and methods for reliable headlight detection.

SUMMARY

The present disclosure provides a computer implemented method, a computer system, a vehicle, and a non-transitory computer readable medium according to the independent claims. Embodiments are given in the subclaims, the description and the drawings.

In one aspect, the present disclosure is directed at a computer implemented method for object detection, the method including the following steps carried out by computer hardware components: acquiring an image; determining a pixel of the image as a base pixel; determining coordinates of a plurality of sets of target pixels, each set of target pixels including a plurality of pixels in a respective pre-determined relationship to the base pixel; for each of the sets of target pixels, determining information representing values of the pixels in the respective set of target pixels; and determining whether a pre-determined object is shown in the image based on the determined information.

In other words, pixels along pre-determined sets of pixels (for example lines) in the image may be evaluated, and based on this evaluation it may be determined whether a pre-determined object (for example a headlight of a vehicle or a pre-determined traffic sign) is shown on the image.

The pre-determined relationship may be a spatial relationship. For example, each set of target pixels may be a line starting from the base pixel.

The respective information representing values of the pixels in the respective set of target pixels for each of the sets of target pixels may be referred to as a descriptor, which may describe the information provided in the image so that a machine learning method, for example an artificial neural network, may evaluate the image, for example to determine whether a pre-determined object is shown on the image, without having to consider each and every pixel of the image. For example, the pixels of the image may be evaluated to determine information that is more descriptive or more useful for the machine learning method than the pixel values as such, and this information may be the descriptor. The descriptor may describe certain image regions.

The descriptor and the method which determines and uses the descriptor may be used in a system for providing an image descriptor for distinguishing vehicle lights from other light sources in proximity of the road and may be used in various ADAS (advanced driver-assistance systems) functions, for example adaptive headlight control (AHC).

According to another aspect, it is determined whether the pre-determined object is shown in the image based on the determined information using an artificial neural network.

According to another aspect, the pre-determined object may include or may be a headlight of a vehicle. Information indicating whether a headlight of a vehicle is present in the image may be used for adaptive headlight control, for example to avoid glaring of other drivers, while providing as much light as possible in the surrounding of the vehicle on which the method is carried out.

According to another aspect, the pre-determined object may include or may be a traffic sign. Information indicating whether a pre-determined traffic sign is present in the image may be used for cruise control (for example to set the maximum allowable speed) or for general vehicle behavior (for example to avoid overtaking in zones where overtaking is not allowed).

According to another aspect, each set of target pixels may include pixels along a line through the base pixel in the image. It will be understood that since an image includes a plurality of pixels, a line in an image consists of several (discrete) pixels, so that the line actually is an approximation of a line in the image. Given a starting point (for example the base pixel) and a desired direction or a desired end point, the pixels which approximate the line through the starting point and with the desired direction or through the desired end point, may, for example, be determined according to Bresenham's method.

According to another aspect, the respective lines of the plurality of sets of target pixels may have pairwise different directions. According to another aspect, the respective lines of the plurality of sets of target pixels may include pairs of lines having opposite directions.

According to another aspect, the image may be acquired based on determining an area of high intensity (or high brightness) in an input image (which may for example be provided by a camera mounted on a vehicle) and determining a crop of the input image around the area of high intensity (or high brightness) as the image. Pixels in the input image may be considered as having high intensity if the intensity is higher than a pre-determined threshold. The pre-determined threshold may be determined based on the input image (for example based on an average intensity or a median intensity). It will be understood that intensity and brightness may be used interchangeably.

According to another aspect, the information representing values of the pixels in the respective set of target pixels may include or may be the values of the pixels in the respective set of target pixels. Using the values of the pixels may keep all information of the pixels.

According to another aspect, the information representing values of the pixels in the respective set of target pixels may include or may be binarized values of the pixels in the respective set of target pixels. Binarized values of the pixels may be represented by "0" and "1" or any other binary representation having two different values. Using a binary representation may reduce memory requirements, since instead of the entire information of the pixels (which is more than one bit per pixel in case of grayscale images or color images), only one bit per pixel needs to be stored. One of the two binary values may be used for representing bright pixels (which may have an intensity or brightness higher than a pre-determined threshold), and the other one of the two binary values may be used for representing dark pixels (which may have an intensity or brightness lower than a pre-determined threshold). The pre-determined threshold may be determined based on the input image (for example based on an average intensity of the input image or a median intensity of the input image). With the binary representation, a binary blob shape descriptor for high beam control methods may be provided.

Instead of a binary representation, also a fuzzy representation with more than two possible values (for example with four values representing "very dark", "dark", "bright" and "very bright") may be used.

According to another aspect, the information representing values of the pixels in the respective set of target pixels may include or may be information of pixels along a pre-determined order of the pixels until a first pixel with a pre-determined property is present. The pre-determined order may for example be an order of subsequent pixels along a line. The pre-determined property may for example be having an intensity (or brightness) lower than a pre-determined threshold (i.e. a dark pixel). The information of pixels may include a count of pixels. Illustratively, the information may provide a number of bright pixels before the first dark pixel is present in the pre-determined order. Even if after the first dark pixel one or more further bright pixels would be present, these one or more further bright pixels would not be included in the count. It has been found that this may make the method robust against noise or reflections.

According to another aspect, the information representing values of the pixels in the respective set of target pixels may include or may be information of pixels having a pre-determined property (for example of being a bright pixel or for example of being a dark pixel). For example, the information representing values of the pixels in the respective set of target pixels includes the number of pixels with the pre-determined property. The number of pixels may be the count of pixels. Illustratively, for example all bright pixels may be counted in the respective sets of pixels, irrespective of an order of the pixels in the set and irrespective of where dark pixels may be present (for example in between bright pixels).

According to another aspect, the information representing values of the pixels in the respective set of target pixels may include or may be an indicator for each of the pixels indicating whether the respective pixel has the pre-determined property (for example of being a bright pixel or for example of being a dark pixel). This may result in binarized representations for the respective pixels.

In another aspect, the present disclosure is directed at a computer system, said computer system including a plurality of computer hardware components configured to carry out several or all steps of the computer implemented method described herein.

The computer system may include a plurality of computer hardware components (for example a processor, for example processing unit or processing device or processing network, at least one memory, for example memory unit or memory device or memory network, and at least one non-transitory data storage). It will be understood that further computer hardware components may be provided and used for carrying out steps of the computer implemented method in the computer system. The non-transitory data storage and/or the memory may include a computer program for instructing the computer to perform several or all steps or aspects of the computer implemented method described herein, for example using the processor and the at least one memory.

In another aspect, the present disclosure is directed at a vehicle including a camera configured to acquire the image (or an input image which may be cropped to obtain the image) and the computer system as described above.

According to another aspect, the vehicle further includes: at least one headlight; and a control system configured to control the at least one headlight based on whether a headlight of another vehicle is shown in the image acquired by the camera. For example, the control system may control the headlight to switch between low beam and high beam, thereby providing an Adaptive Headlight Control (AHC) functionality.

In another aspect, the present disclosure is directed at a non-transitory computer readable medium including instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Headlights of vehicles may operate in two modes by generating low beams and high beams. Low beams in some countries must be used at daytime but mainly low beams are designed to illuminate the road at night when other vehicles are present. When there is no other traffic, high beams may be used since high beams provide significantly-more light.

Adaptive Headlight Control (AHC) may be provided in vehicles as a functionality of automatically switching between low beam and high beam. According to various embodiments, a descriptor may be provided which may be used for AHC or for any other applications where vehicle lights need to be distinguished from other sources of lights located in the proximity of the road. The AHC system may be responsible for automatic switching between high and low beams in the situation when a driver from an oncoming or preceding car could be dazzled by an excessive glare.

AHC is intended to work mainly at night or under insufficient light conditions. This may result in the necessity of finding special characteristics of vehicles moving at nighttime. According to various embodiments, a descriptor may be provided which may describe light blobs that are detected in the image from the camera mounted on (for example inside) the vehicle. A blob may be an area in an image of high intensity or high brightness (for example higher than in the surrounding pixels).

In order to provide AHC functions, various processing stages may be carried out based on an image received from a camera mounted on the vehicle. The processing stages may include image preprocessing, image segmentation and spots/blobs recognition in the camera image, determination of at least one descriptor, and classification of the light spots, like will be described in more detail below.

At the image preprocessing stage, commonly used image processing techniques may be used, such as smoothing low pass filtering or noise cancelation. An original camera image ($I_1$) may be the input for this stage and an enhanced image ($I_2$) may be produced as its output.

At the stage of image segmentation and spots/blobs recognition in the camera image, the $I_2$ images may be received as an input, output from the previous stage of image preprocessing. The aim of this stage may be the localization of light sources in the (camera) images and cropping the part of the images where the light sources are found. The result of the signal processing carried out at this stage is a set of images, $I_{3,n}$, with predefined size, e.g. 15×15 (odd version) or 16×16 (even version) pixels, which are resized parts (i.e. crops which may have been resized) of the $I_2$ image. As a result, in the $I_{3,n}$ images, the center of the detected light blob may more or less overlap with the center of a given image $I_{3,n}$. The index n may be the number of light blobs found in a given image frame.

At the stage of determining at least one descriptor, particular $I_{3,n}$ images are further processed. Various image descriptors may be determined in order to extract specific features of the particular light spots. Various descriptors applicable in AHC functionality may include Histogram of Oriented Gradients (HoG), Local Binary Pattern (LBP), SIFT (Scale-Invariant Features), SURF (Speeded Up Robust Features), intensity features, color information, and/or blob location.

At the stage of classification of the light spots, the feature values (i.e. the values of the descriptors), which have been determined at the previous stage of determining at least one descriptor, are taken as the input for a classifier, for example for a convolutional neural network (CNN) classifier. The light spots can be assigned to one of the three categories (or classes): "headlights", "taillights", and "other" classes of light sources. It will be understood that various kinds of classifiers may be used. The descriptor according to various embodiments may be used with different classifiers and classification methods.

Various aspects that are related to the requirements of the active safety functions of the AHC may be taken into consideration. One of them is the size of input data upon which the final decision about assigning a light spot to a given specific class is made. Furthermore, according to various embodiments, high reliability and accuracy of the AHC function may be provided. The following system requirements may be satisfied and dealt with according to various embodiments: light spots may be the only available data to the AHC system; lack of information about road and lane limits; necessity of proper operation under all weather conditions; and necessity of two-wheel vehicle recognition, which causes that making a classification decision on detected pairs of lights (as in case of cars) is risky and due to safety reasons not possible.

Above-mentioned constraints and limitations are significant, since in order to perform accurate light spot classification, only some of their parameters may be used, such as: total intensity, intensity distribution of pixels in a spot, color information, shape and to some extent location of a spot in the input image ($I_1$).

Furthermore, the AHC system according to various embodiments may operate in real-time with limited hardware resources.

A high accuracy of light spot classification in the camera images for AHC may require using many (for example more than 30) different descriptors which may be provided in parallel as inputs to the CNN. However, a higher number of used descriptors does not necessarily correspond to a better accuracy of the AHC classification. Moreover, the more descriptors are calculated, the more computational power is needed. The optimal sets of descriptors needs to be selected experimentally which is an exhaustive task. Comprehensive investigations performed with descriptors of different type show that when the descriptors are used separately in the classification task, an efficiency of the AHC function does not exceed 40-50%, which is not sufficient according to safety requirements.

According to various embodiments, a descriptor is provided which, after being applied, leads to significant improvement of light spot classification. This fact was verified during experimental tests regarding the AHC function. Using the descriptor according to various embodiments may provide low computational power demand, which may be useful for example in situations when the hardware resources are limited.

Using the descriptor according to various embodiments allows replacing or eliminating some number of other commonly used descriptors, while keeping or even improving the classification accuracy. Since the eliminated other descriptors may be more computationally complex, this may translate into a reduction of the computational effort.

Patent application WO2017093037, which is incorporated herein by reference in its entirety, may be used at the second stage of the overall procedure described above. This patent application describes a method that allows to localize light spots in images with dark background. A similar situation appears at night, when the AHC functionality is active. Under such conditions, the general background is also dark and at the same time the light sources are visible as bright spots.

The descriptor according to various embodiments may be used in the procedure of the classification of light spots that is applied in the AHC functions, and may be applied, for example, at the stage of determination of at least one descriptor as described above. The light spots in the image may represent objects of different type located in the vicinity of the moving vehicle. The procedure may be divided into several steps, as described in more detail below.

At a first step, the light spots in the $I_{3,n}$ images may be centered. The descriptor may receive centered spots, which may have been centered using a commonly used method.

At a second step, the processed $I_{3,n}$ images with the light spots may first be binarized with an appropriate threshold, wherein the threshold may be adaptively adjusted according to brightness distribution. This is illustrated in FIG. 1 for selected typical situations.

Figure 1:
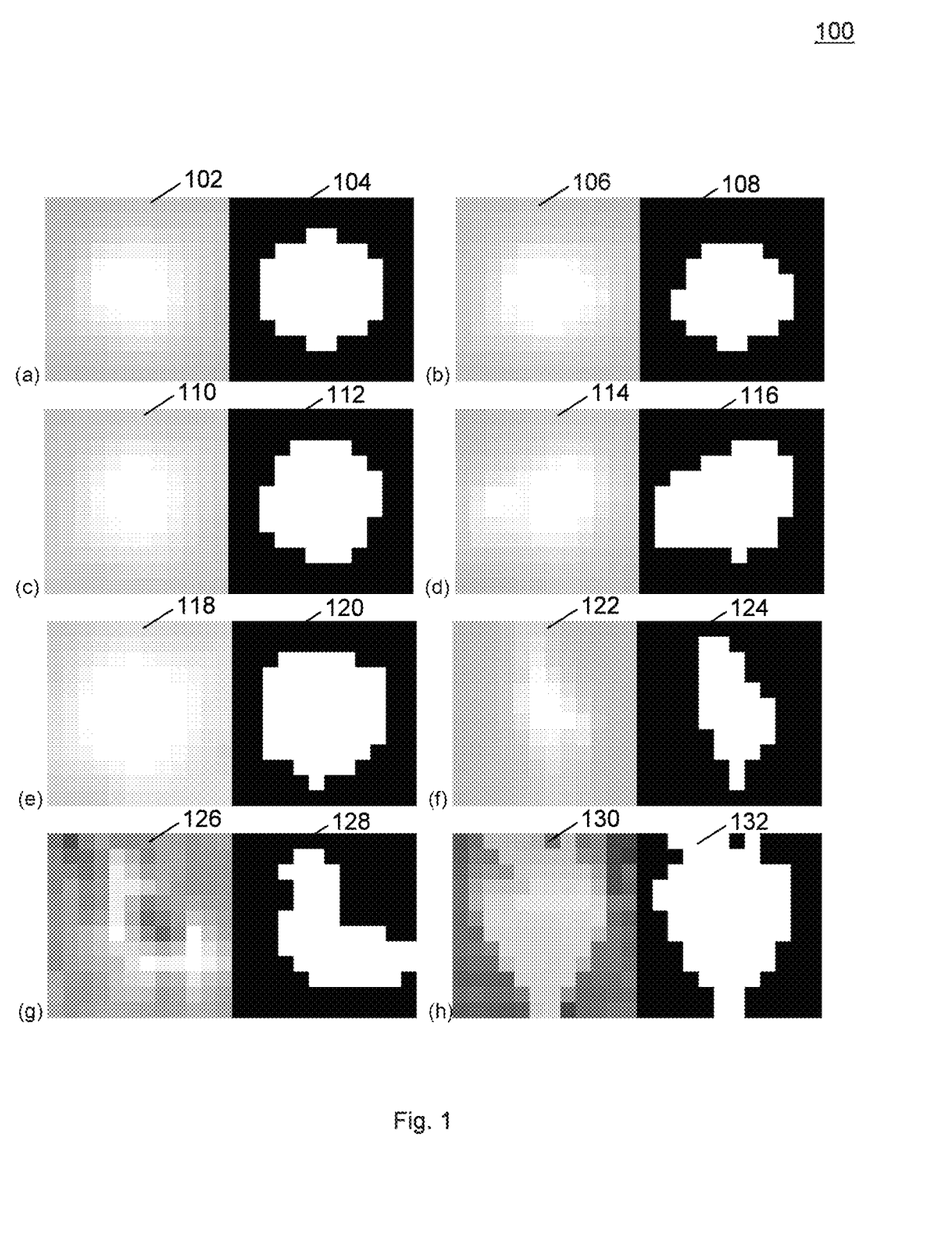
FIG. 1 an illustration of various light spots and their binary representations according to various embodiments.

FIG. 1 shows an illustration 100 of various light spots 102, 106, 110, 114, 118, 122, 126, 130 and their binary representations 104, 108, 112, 116, 120, 124, 128, and 132 according to various embodiments.

The operation of binarization allows that subsequent steps of the method according to various embodiments may focus only on the contours of the spot. The binarization may reduce the amount of data necessary to unambiguously classify the spot to one of the categories. After the binarization, only one bit is required to store a single pixel.

FIG. 1 presents several typical cases that may be encountered during the binarization. Sub-diagrams (a) and (b) present more regular spots usually associated with vehicles' lights. Sub-diagram (c) shows a situation in which a square spot is rotated to some degree. The (d)-(h) sub-diagrams illustrate less regular spots. Such spots are usually associated with other light sources, however sometimes due to a fuzzy effect may also be provided by car lights.

According to various embodiments, the overall image may binarized and then stored in the memory. Alternatively, according to various embodiments, binarization may be performed "on the fly" (OTF) over only selected pixels, which may simplify the overall operation. According to various embodiments, only those pixels that are involved in the determination (for example counting operation) of the descriptor as described in the fourth step below may be binarized.

The binarization of an overall image requires j·k operations, each operation including a thresholding operation, where j and k are the sizes (width and height) of the $I_3$ images. In the OTF approach, on the other hand, the binarization is performed only on those pixels in the $I_{3,n}$ images, which are overlapped by particular directions as described in the third step below. Furthermore, in the OTF approach, the memory requirements may be reduced.

Figure 2A:
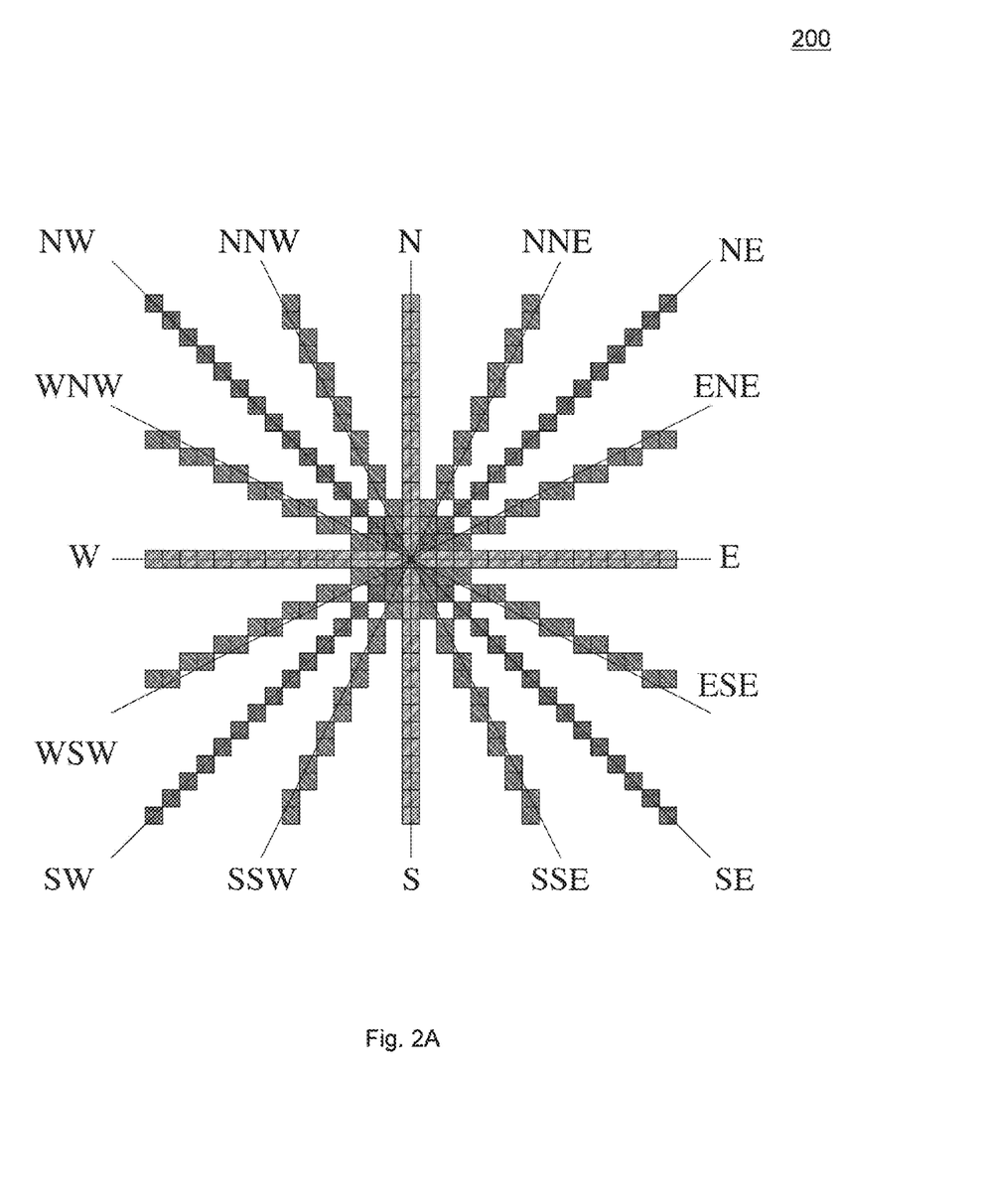
FIG. 2A to FIG. 2G illustrations of various directions used in a descriptor according to various embodiments.
Figure 2B:
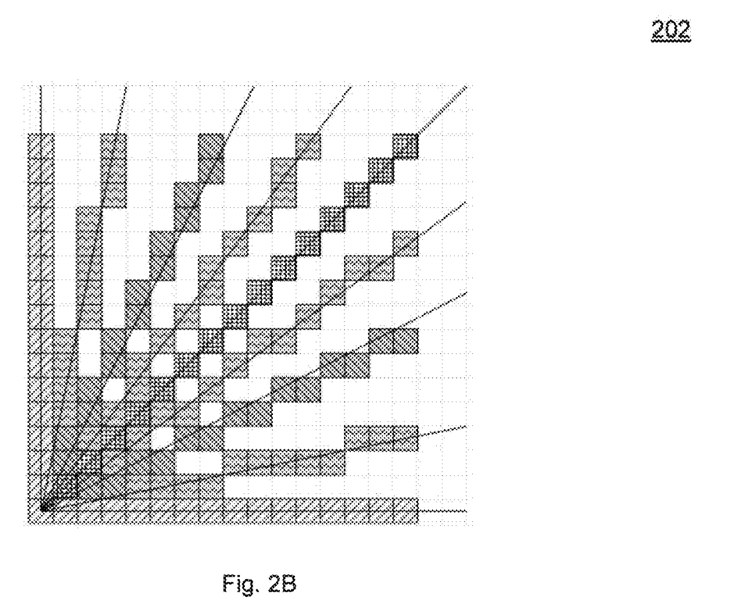

At a third step, the plurality of directions along which the light pixels are counted for the descriptor may be selected. Directions in this case may mean lines (or approximations of lines on the grid of pixels) that concentrically diverge from the center (in other words: base pixel) of an image $I_{3,n}$ to its borders, as shown in FIG. 2A and FIG. 2B for an example case of square (j=k), odd-sized image spot, with j=31. The pixels in the respective lines may be referred to as target pixels.

The number of used directions may vary, for example depending on how exactly the spots need to be described and/or depending on how much computational power and/or memory space is available.

The higher the angular density of the directions is, the more details of the shape of the spots may be distinguished. Although, increasing the number of directions increases the memory occupancy, as well as the time needed to compute the descriptor, however, the increase in these values is not substantial.

A different number of directions may be used, depending on the level of details and parameters of the processed light spots. This question is explained in more detail below.

To maintain symmetry, cases with 4, 8, 16 or 32 directions may be considered. Corresponding binary descriptors may be denoted as BD4, BD8, BD16, and BD32, respectively.

FIG. 2A to FIG. 2G show illustrations of various directions used in a descriptor according to various embodiments. FIG. 2A to FIG. 2G illustrate in detail which pixels are taken into account in which case. While FIG. 2B to FIG. 2G only show one quadrant, the same indexing approach is used in the remaining three quadrants (not shown in FIG. 2B to FIG. 2G).

FIG. 2A shows an illustration 200 of all directions up to BD16 descriptors (four quadrant view) according to various embodiments. FIG. 2B shows an illustration 202 of selected directions for all up to BD32 descriptor (one quadrant view) according to various embodiments.

Figure 2C:
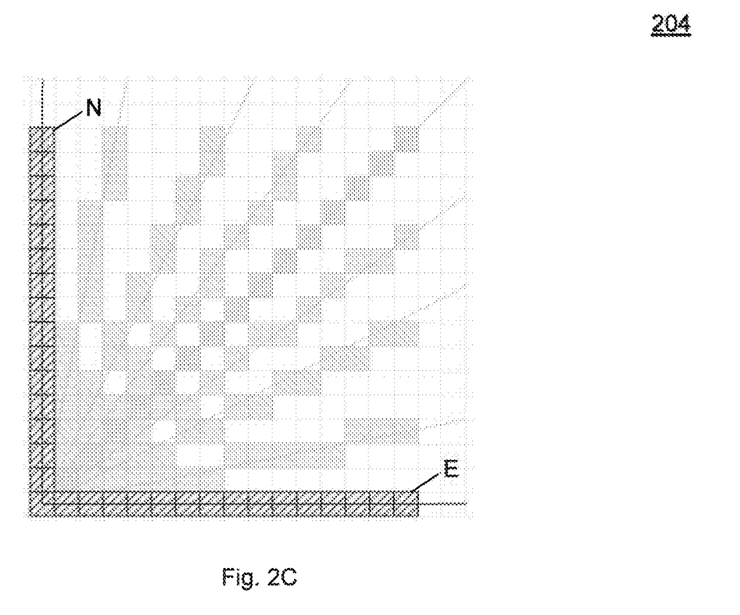

FIG. 2C shows an illustration 204 of selected directions for BD4 descriptor (one quadrant view) according to various embodiments. The BD4 descriptor uses only four directions, two vertical directions (N (for north), S (for south)) and two horizontal directions (W (for west), E (for east)). In FIG. 2A and FIG. 2C, the N and E directions (which are located in or adjacent to the first quadrant) are illustrated.

Figure 2D:
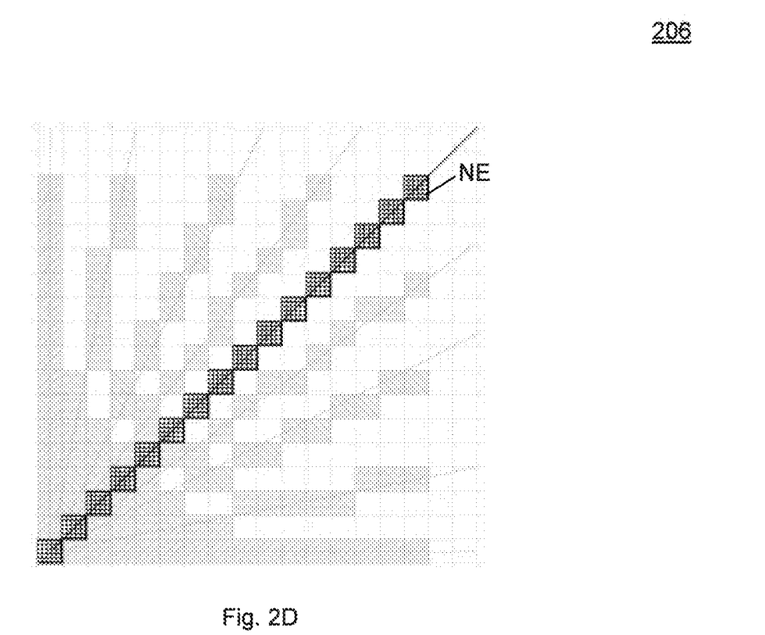

FIG. 2D shows an illustration 206 of additional directions used in BD8 descriptor (one quadrant view) according to various embodiments. The BD8 descriptor uses the same directions as BD4, with additional four diagonal directions: NW, NE, SE, SW, which are illustrated in FIG. 2A and FIG. 2D.

Figure 2E:
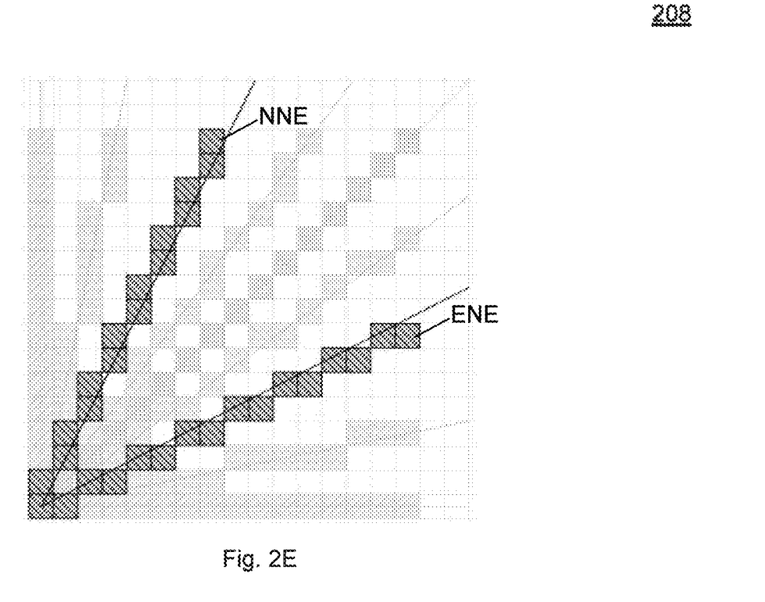

FIG. 2E shows an illustration 208 of additional directions used in BD16 descriptor (one quadrant view) according to various embodiments. The BD16 descriptor, in the comparison with the BD8 one, additionally uses intermediate directions denoted as: NNE, ENE, ESE, SSE, SSW, WSW, WNW and NNW, as illustrated in FIG. 2A and FIG. 2E.

Figure 2F:
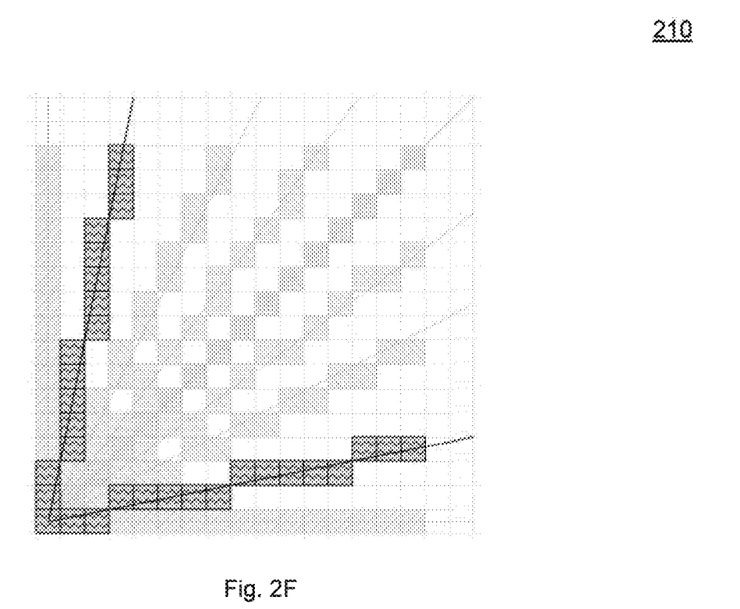
Figure 2G:
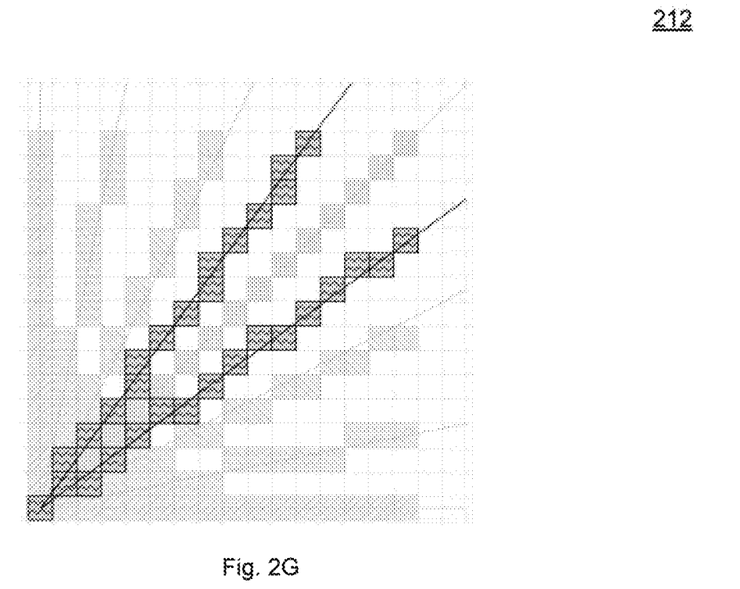

FIG. 2F and FIG. 2G show illustrations 210 and 212 of additional directions used in BD32 descriptor (one quadrant view) according to various embodiments.

According to various embodiments, an efficient way of indexing over the two-dimensional input matrix (image $I_{3,n}$) is provided. For illustrative purposes, a square image $I_{3,n}$ with the sizes j=k=15 (an odd case) may be considered. In this example, it may be assumed that the coordinates of the upper left corner of the image are (0, 0), while of the lower right corner are (M, M), where M=j−1, in this case. The pixels to be considered in particular directions are selected based on Bresenham's algorithm, as illustrated in FIG. 2B to FIG. 2G. Indexing over the matrix of pixels in particular cases may be performed as presented below. In this example, the coordinates of the central point (in other words: base pixel) of the image equal to ($c_x$=M/2; $c_y$=M/2).

For the BD4 descriptor, the coordinates along the N, S, W, and E directions may be as follows:

N: IDx=cx; IDy=cy−(0, . . . , M/2);
S: IDx=cx; IDy=cy+(0, . . . , M/2);
W: IDy=cy; IDx=cx−(0, . . . , M/2);
E: IDy=cy; IDx=cx+(0, . . . , M/2).

For the BD8 descriptor, the coordinates along the N, S, W, and E directions may be identical to the ones of the BD4 descriptor, and the additional diagonal directions (NW, NE, SW, and SE) may be included as follows:

NW: IDx=cx−(0, . . . , M/2); IDy=cy−(0, . . . , M/2);
NE: IDx=cx+(0, . . . , M/2); IDy=cy−(0, . . . , M/2);
SW: IDx=cx−(0, . . . , M/2); IDy=cy+(0, . . . , M/2);
SE: IDx=cx+(0, . . . , M/2); IDy=cy+(0, . . . , M/2).

For the BD16 descriptor, the coordinates along the N, S, W, E, NW, NE, SW, and SE directions may be identical to the ones of the BD8 descriptor, and the additional diagonal directions (NNE, ENE, ESE; SSE, SSW, WSW, WNW, NNW) may be included as follows, wherein >> may indicate the bitwise shift operator:

NNE: $ID_x$=$c_x$−(0, . . . , M/2)>>1; $ID_y$=$c_y$−(0, . . . , M/2)>>0;
ENE: $ID_x$=$c_x$+(0, . . . , M/2)>>0; $ID_y$=$c_y$−(0, . . . , M/2)>>1;
ESE: $ID_x$=$c_x$−(0, . . . , M/2)>>0; $ID_y$=$c_y$+(0, . . . , M/2)>>1;
SSE: $ID_x$=$c_x$+(0, . . . , M/2)>>1; $ID_y$=$c_y$+(0, . . . , M/2)>>0;
SSW: $ID_x$=$c_x$−(0, . . . , M/2)>>1; $ID_y$=$c_y$−(0, . . . , M/2)>>0;

WSW: $ID_x=c_x+(0, \ldots, M/2)\!\gg\!0$; $=c_y-(0, \ldots, M/2)\!\gg\!1$;
WNW: $ID_x=c_x-(0, \ldots, M/2)\!\gg\!0$; $ID_y=c_y+(0, \ldots, M/2)\!\gg\!1$;
NNW: $ID_x=c_x+(0, \ldots, M/2)\!\gg\!1$; $ID_y=c_y+(0, M/2)\!\gg\!0$.

At a fourth step, the light pixels along particular directions may be counted, starting from the center of the spots ($I_3$ images), i.e. starting from the base pixel. The counting may be performed using the Binary Coded Decimal (BCD). Alternatively, a direct binary representation (BIN) may be used. With the BCD approach, the resulting code may have smaller memory usage, however, the information about the distribution of light pixels in particular directions may be lost. The BIN representation may be more suitable for describing nonconvex objects in which discontinuities may appear in bright areas when looking in particular directions.

A dark pixel may be a pixel with brightness (or intensity) below a pre-determined threshold. For example, a dark pixel may be represented by a value of 0 in a binarized image.

A bright pixel may be a pixel with brightness (or intensity) above a pre-determined threshold. For example, a bright pixel may be represented by a value of 1 in a binarized image.

According to various embodiments, the counting operation may be performed so that it stops after reaching a first dark pixel in a given direction. This may allow roughly filtering out noise, which may be due to, for example, reflections of irregular surfaces, for example reflections on water. Such problems with reflections may result in a non-regular shape of the spot.

Figure 3A:
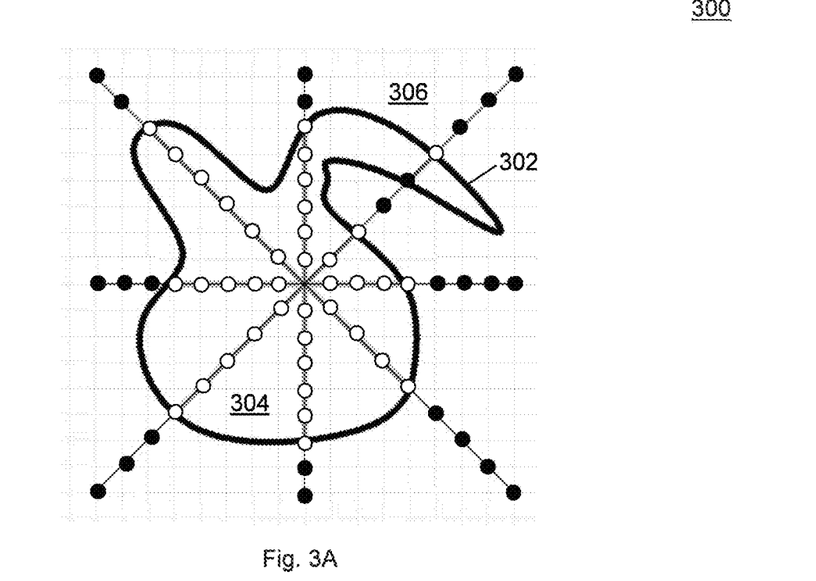
FIG. 3A an example of a non-convex spot.

FIG. 3A shows an illustration 300 of an example of a non-convex spot. A contour 302 of a blob (in other words: spot) is shown, and it is assumed that the area 304 inside the contour 302 is bright, and the area 306 outside the contour 302 is dark. Dark pixels are illustrated by filled (in other words: black) circles, and bright pixels are illustrated by unfilled (in other words: white) circles in FIG. 3A. Starting from the center pixel (which may also be referred to as a base pixel), which may be a bright pixel since it may be the center of gravity (or any other kind of center point) of the blob, the sequence of bright and dark pixels along the pre-determined directions may be determined. The center pixel may not be taken into account (since it may be assumed to be a bright pixel always). For sake of legibility of the drawings, not all reference signs and circles of FIG. 3A are included in FIG. 3B to FIG. 3E, but it will be understood that the spot (or blob) shown in each of FIG. 3B to FIG. 3E is identical to the spot (or blob) shown in FIG. 3A.

FIG. 3B to FIG. 3E show illustrations of different options of counting pixels of particular directions for the non-convex spot of FIG. 3A according to various embodiments.

Figure 3B:
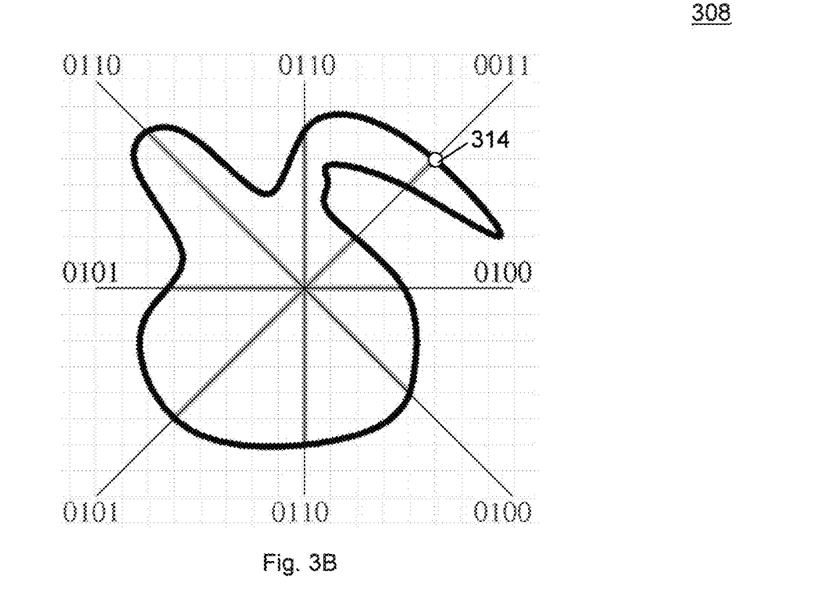
FIG. 3B to FIG. 3E illustrations of different options of counting pixels of particular directions for the non-convex spot of FIG. 3A.

FIG. 3B shows an illustration 308 of the BCD approach according to various embodiments, in which all bright pixels in the particular directions are counted. In the presented example, the result for the NE direction is 3 (with a binary representation of 0011), as pixel 314 inside an object visible in the upper right corner, stuck to the regular part of the spot (i.e. inside the area 304 which includes bright pixels), is also taken into account. Likewise, in the E direction, four bright pixels (with a binary representation of 0100) are present; in the SE direction, four bright pixels (with a binary representation of 0100) are present; in the S direction, six bright pixels (with a binary representation of 0110) are present; in the SW direction, five bright pixels (with a binary representation of 0101) are present; in the W direction, five bright pixels (with a binary representation of 0101) are present; in the NW direction, six bright pixels (with a binary representation of 0110) are present; and in the N direction, six bright pixels (with a binary representation of 0110) are present. The binary representations of the pixel count are indicated next to the respective direction in FIG. 3B.

Figure 3C:
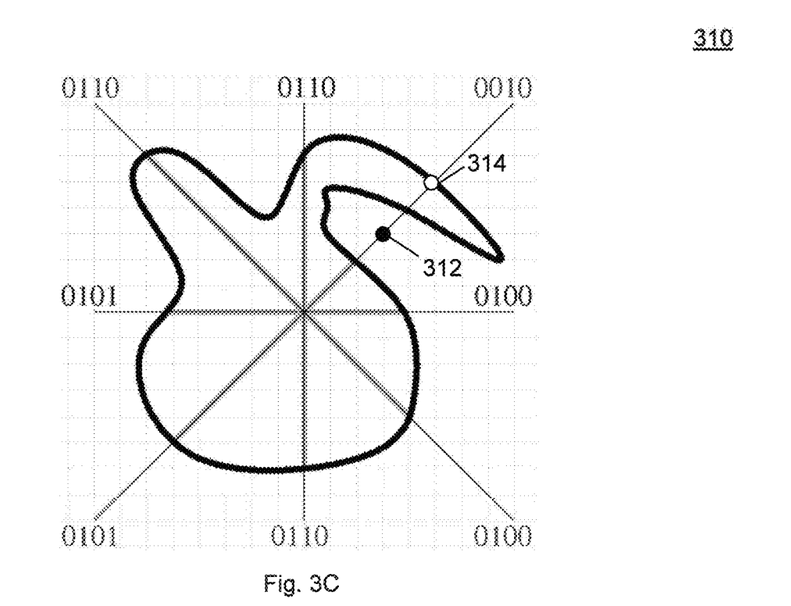

FIG. 3C shows an illustration 310 of counting of the pixels with detection of a discontinuity (which may be referred to as BCD_CUT approach) according to various embodiments, in which the pixels are counted in a given direction (for example from the base pixel outwards, without counting the base pixel) until a dark pixel is encountered for the first time. The remaining pixels are then cut-off (in other words: not counted), independently on their values. In the example illustrated in FIG. 3C, the first dark pixel in the NE direction is pixel 312, so that the bright pixels more outside than pixel 312 are not taken into account when counting. Thus, the bright pixel 314 is not counted, and the count of bright pixels until the first dark pixel occurs in the NE direction is 2 (represented by binary value 0010). The pixel counts in the other directions are identical to the pixel counts as described with reference to FIG. 3B, since in the other directions, no bright pixel occurs after the first dark pixel. The binary representations of the pixel count are indicated next to the respective direction in FIG. 3C.

Figure 3D:
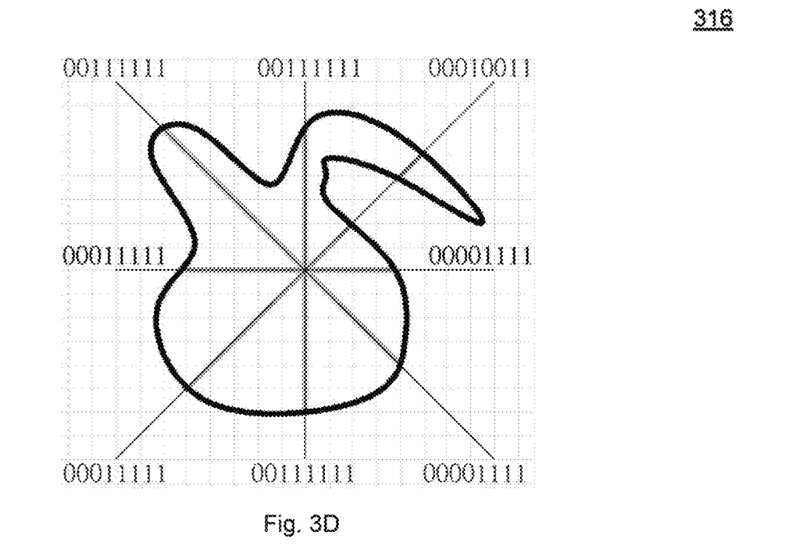

FIG. 3D shows an illustration 316 of a direct representation of pixels (which may be referred to as the BIN approach) according to various embodiments, in which the values of the binarized pixels (in other words: information indicating whether a pixel is a bright pixel or a dark pixel) is used as the information representing the values of the pixels in the respective set of target pixels (in other words: is used as the descriptor). In the NE direction, the innermost pixel closest to the base pixel is bright, so that the last digit of a binary number representing the binarized pixel values is 1. The next pixel in the NE direction is also bright, so that the second last digit of the binary number is 1. Then two dark pixels follow, so that the third last and fourth last digits of the binary number for the NE direction are 0 and 0, preceded by a digit of 1 representing the bright pixel 314 illustrated in FIG. 3C, and three digits of 0 representing the outermost three pixels which are dark pixels. Thus, the binary representation for the NE direction is 0010011. Likewise, the binary representation for the E direction is 00001111; the binary representation for the SE direction is 00001111; the binary representation for the S direction is 00111111; the binary representation for the SW direction is 00011111; the binary representation for the W direction is 00011111; the binary representation for the NW direction is 00111111; and the binary representation for the N direction is 00111111. The binary representations of the binarized pixel values are indicated next to the respective direction in FIG. 3D.

Figure 3E:
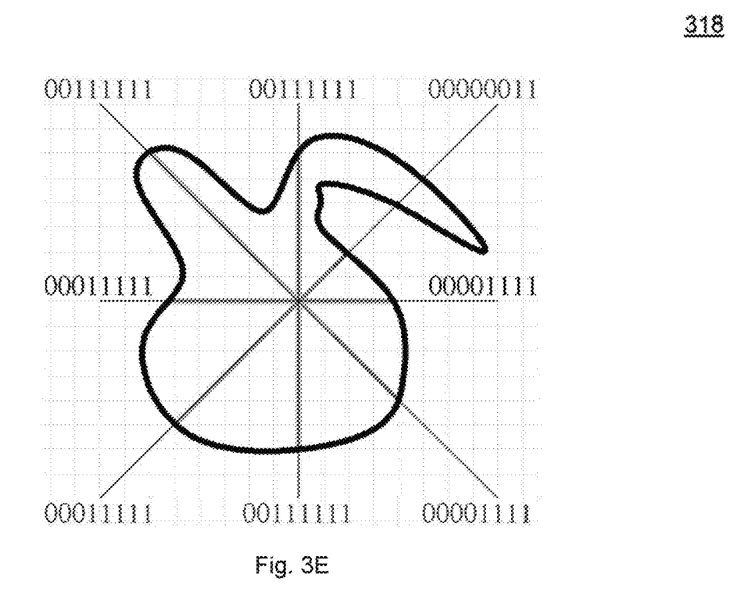

FIG. 3E shows an illustration 318 of a direct representation of pixels with detection of a discontinuity (which may be referred to as BIN_CUT approach) according to various embodiments, in which a discontinuity (a first dark pixel) in particular directions (BIN_CUT case) is detected, and the bright pixels after the first dark pixel are treated as dark pixels irrespective of their actual brightness or intensity, similar to the approach illustrated in FIG. 3C, so that the actual bright pixel 314 is treated as a dark pixel in the binary representation of the NE direction, so that the binary representation is 00000011. The binary representations in the other directions are identical to the binary representations as described with reference to FIG. 3D, since in the other directions, no bright pixel occurs after the first dark pixel. The binary representations of the binarized pixel values are indicated next to the respective direction in FIG. 3E.

At a fifth step, the determined information (for example the counted number of pixels), the descriptor, is stored in a memory. The sizes of the $I_{3,n}$ images may be small, for example not exceeding 32×32. This results in a maximum of 16 pixels in each direction. In this case, only several typical 32-bit integer variables may be sufficient to describe the spot. The number of integer values equals the number of directions divided by 2, for example 2 for BD4, 4 for BD8, etc.

According to various embodiments, the number of directions that are used for the descriptor may have an impact on the accuracy of the method, like will be described below.

The number of directions may differ, as mentioned above and shown in FIG. 2A to FIG. 2G. Every increasing of the number of directions may allow to describe the light spot in more detail. Each following descriptor (i.e. each descriptor with additional directions that are considered) may allow distinguishing other details of the spot.

The binary descriptor with four directions (BD4) may not allow distinguishing a circle from a square, and a rectangle from an ellipse. However, the BD4 descriptor may allow distinguishing a general ellipse (i.e. an ellipse which is not a circle) from a circle, and a general rectangle (i.e. a rectangle which is not a square) from a square. The BD descriptor also may not allow determining if the mentioned geometric figures are rotated. While rotating a square object, in each of the four directions there are equal numbers of pixels. However, while rotating the object, the number of pixels in each direction equally increases, reaching their maximum values for rotations by 45, 135, 225, 315 degrees. In case of rotating an ellipse or a rectangle objects, the BD4 descriptor may allow determining if the object is oriented vertically or horizontally. However, it may not be possible to determine the rotation angle.

The binary descriptor with eight directions (BD8) uses the vertical, horizontal, as well as diagonal directions. The BD8 descriptor may allow distinguish shapes such as circles, squares, rectangles, ellipses and other more irregular objects. In this case, it may also be possible to determine if a regular object is rotated.

With the binary descriptor with sixteen directions (BD16), it may be possible to describe and distinguish the various spots shown in FIG. 1. However, in many practical situations, it may not be required to provide so detailed information.

In various AHC applications, it may be desired to distinguish streetlamps from vehicle lights. In this case, the BD8 descriptor may be sufficient. Furthermore, for the AHC function, it may also be desired to distinguish head vehicle lights from tail vehicle lights.

The method after an additional adaptation may also be used in traffic sign recognition (TSR) functions to distinguish digits on traffic signs. For example, a number on a traffic sign (for example indicating a speed limit) may be localized and particular digits of this number may be treated as spots to be recognized. In case of bad quality images (e.g. blurred due to bad weather), the contrast between the digits and their background may be low. In such a case, the digits may look like spots with shapes that differ for the '0' and '5' cases. For example, the descriptor according to various embodiment may be used to distinguish between '0' and '5', and the output of the descriptor in case of '0' may be different from the output of the descriptor in case of '5'. In the region of North America, for example, there may be a need to distinguish the number 0 and 5 at the second position in speed limit traffic signs (e.g. 20 and 25 mph). In this case, BD16 or BD32 descriptors may be required.

Figure 4:
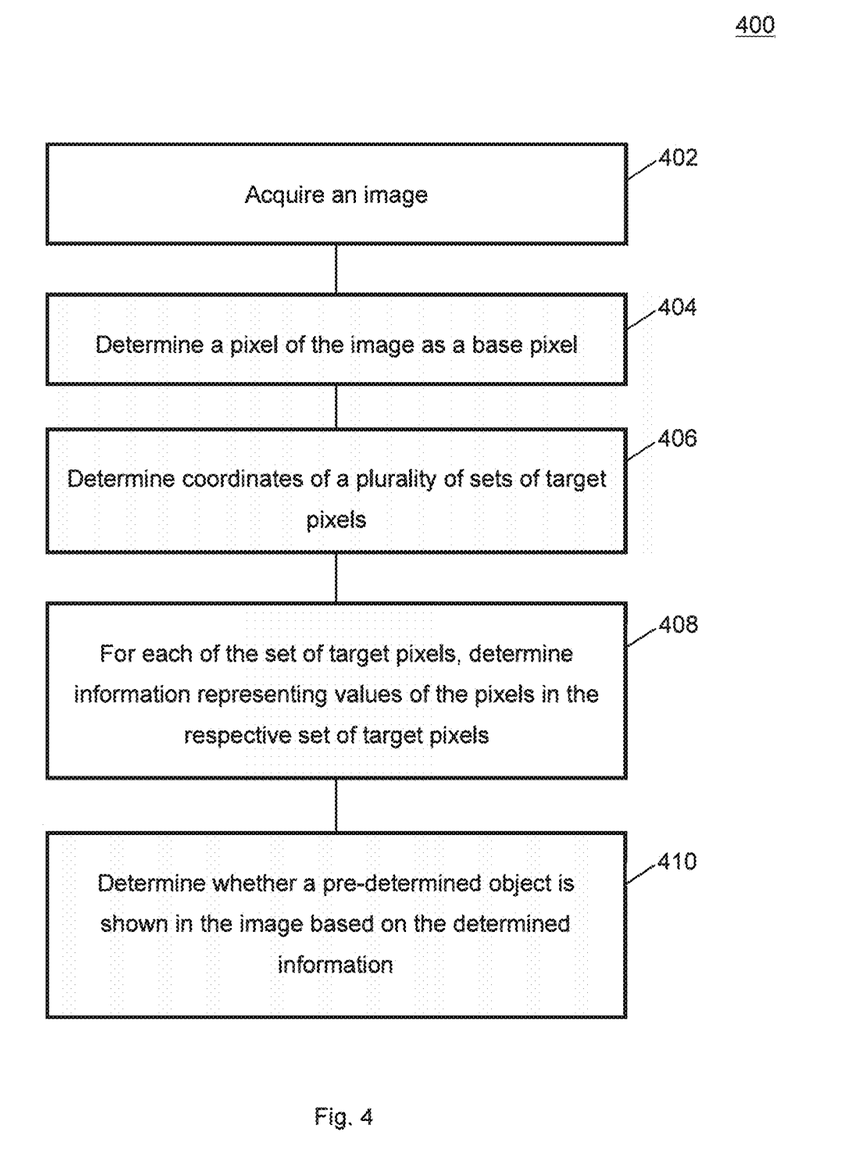
FIG. 4 a flow diagram illustrating a method for object detection according to various embodiments.

FIG. 4 shows a flow diagram 400 illustrating a method for object detection according to various embodiments. At 402, an image may be acquired. At 404, a pixel of the image may be determined as a base pixel. At 406, coordinates of a plurality of sets of target pixels may be determined. Each set of target pixels may include a plurality of pixels in a respective pre-determined relationship to the base pixel. At 408, information representing values of the pixels in the respective set of target pixels may be determined for each of the sets of target pixels. At 410, it may be determined whether a pre-determined object is shown in the image based on the determined information.

According to various embodiments, it may be determined whether the pre-determined object is shown in the image based on the determined information using an artificial neural network.

According to various embodiments, the pre-determined object may include or may be a headlight of a vehicle.

According to various embodiments, the pre-determined object may include or may be a traffic sign.

According to various embodiments, each set of target pixels may include pixels along a line through the base pixel in the image. According to various embodiments, the respective lines of the plurality of sets of target pixels may have pairwise different directions.

According to various embodiments, the image may be acquired based on determining an area of high intensity in an input image and determining the image as a crop of the input image around the area of high intensity.

According to various embodiments, the information representing values of the pixels in the respective set of target pixels may include or may be the values of the pixels in the respective set of target pixels.

According to various embodiments, the information representing values of the pixels in the respective set of target pixels may include or may be binarized values of the pixels in the respective set of target pixels.

According to various embodiments, the information representing values of the pixels in the respective set of target pixels may include or may be information of pixels along a pre-determined order of the pixels until a first pixel with a pre-determined property is present.

According to various embodiments, the information representing values of the pixels in the respective set of target pixels may include or may be information of pixels having a pre-determined property.

According to various embodiments, the information representing values of the pixels in the respective set of target pixels may include or may be an indicator for each of the pixels indicating whether the respective pixel has the pre-determined property.

Each of the steps 402, 404, 406, 408, 410 and the further steps described above may be performed by computer hardware components.

What is claimed is:

1. A computer implemented method for object detection, the method comprising:
    acquiring, by computer hardware components, an image by determining a crop to an input image around an area of high intensity determined in the input image;
    determining a pixel of the image as a base pixel;
    determining coordinates of a plurality of sets of target pixels, each set of target pixels comprising a plurality of pixels in a respective pre-determined relationship to the base pixel;

for each of the sets of target pixels, determining information representing values of the pixels in that respective set of target pixels; and determining whether a pre-determined object is shown in the image based on the determined information.

2. The computer implemented method of claim 1, wherein determining whether the pre-determined object is shown in the image based on the determined information using an artificial neural network.

3. The computer implemented method of claim 1,
wherein the pre-determined object comprises a headlight of a vehicle; or
wherein the pre-determined object comprises a traffic sign.

4. The computer implemented method of claim 1, wherein each set of target pixels comprises pixels along a line through the base pixel in the image.

5. The computer implemented method of claim 4, wherein respective lines of the plurality of sets of target pixels have pairwise different directions.

6. The computer implemented method of claim 1, wherein the information representing values of the pixels in that respective set of target pixels comprises the values of the pixels in that respective set of target pixels.

7. The computer implemented method of claim 1, wherein the information representing values of the pixels in that respective set of target pixels comprises binarized values of the pixels in that respective set of target pixels.

8. The computer implemented method of claim 1, wherein the information representing values of the pixels in that respective set of target pixels comprises information of pixels along a pre-determined order of the pixels until a first pixel with a pre-determined property is present.

9. The computer implemented method of claim 1, wherein the information representing values of the pixels in that respective set of target pixels comprises information of pixels having a pre-determined property.

10. The computer implemented method of claim 1, wherein the information representing values of the pixels in that respective set of target pixels comprises an indicator for each of the pixels indicating whether that respective pixel has a pre-determined property.

11. A system, the system comprising:
a computer system having a plurality of computer hardware components configured to:
determine a pixel of an image as a base pixel;
determine coordinates of a plurality of sets of target pixels, each set of target pixels comprising a plurality of pixels in a respective pre-determined relationship to the base pixel;
for each of the sets of target pixels, determine information representing values of the pixels in that respective set of target pixels to include information of pixels along a pre-determined order of the pixels until a first pixel with a pre-determined property is present; and
determine whether a pre-determined object is shown in the image based on the determined information.

12. The system of claim 11, further comprising:
a vehicle, the vehicle comprising:
the computer system; and
a camera configured to acquire the image.

13. The system of claim 12, the vehicle further comprising:
at least one headlight; and
a control system configured to control the at least one headlight based on whether a headlight of another vehicle is shown in the image acquired by the camera.

14. The system of claim 11, wherein the computer hardware components are further configured to acquire the image by determining a crop to an input image around an area of high intensity determined in the input image.

15. A non-transitory computer readable medium comprising instructions that, when executed, configure computer hardware components of a computer system to:
acquire an image by determining a crop to an input image around an area of high intensity determined in the input image;
determine a pixel of the image as a base pixel;
determine coordinates of a plurality of sets of target pixels, each set of target pixels comprising a plurality of pixels in a respective pre-determined relationship to the base pixel;
for each of the sets of target pixels, determine information representing values of the pixels in that respective set of target pixels; and
determine whether a pre-determined object is shown in the image based on the determined information.

16. The non-transitory computer readable medium of claim 15, wherein the instructions, when executed, configure the computer hardware components to determine whether the pre-determined object is shown in the image based on the determined information using an artificial neural network.

17. The non-transitory computer readable medium of claim 15,
wherein the pre-determined object comprises a headlight of a vehicle; or
wherein the pre-determined object comprises a traffic sign.

18. The non-transitory computer readable medium of claim 15, wherein at least one of:
each set of target pixels comprises pixels along a line through the base pixel in the image; or
respective lines of the plurality of sets of target pixels have pairwise different directions.

19. The non-transitory computer readable medium of claim 15, wherein the information representing values of the pixels in that respective set of target pixels comprises at least one of:
the values of the pixels in that respective set of target pixels;
binarized values of the pixels in that respective set of target pixels;
information of pixels having a pre-determined property; or
an indicator for each of the pixels indicating whether that respective pixel has the pre-determined property.

20. The non-transitory computer readable medium of claim 15, wherein the information representing values of the pixels in that respective set of target pixels comprises information of pixels along a pre-determined order of the pixels until a first pixel with a pre-determined property is present.

* * * * *